(12) United States Patent
Schlager et al.

(10) Patent No.: US 7,033,481 B1
(45) Date of Patent: Apr. 25, 2006

(54) ELECTROIONIC PROCESSING SYSTEM

(75) Inventors: Kenneth J. Schlager, Hartland, WI (US); Stephen H. Gorski, Eagle, WI (US)

(73) Assignee: Bioionix, Inc., Madison, WI (US)

( * ) Notice: Subject to any disclaimer, the term of this patent is extended or adjusted under 35 U.S.C. 154(b) by 70 days.

(21) Appl. No.: 10/773,011

(22) Filed: Feb. 4, 2004

(51) Int. Cl.
*C02F 1/461* (2006.01)
*C25D 17/00* (2006.01)

(52) U.S. Cl. ............... 205/701; 205/466; 205/742; 204/228.3; 204/228.6; 204/229.6; 204/275.1; 204/DIG. 5

(58) Field of Classification Search ........... 205/701, 205/742, 466; 204/228.3, 228.6, 229.6, 275.1, 204/DIG. 5
See application file for complete search history.

(56) References Cited

U.S. PATENT DOCUMENTS

| | | | |
|---|---|---|---|
| 4,440,611 A | 4/1984 | Dhar et al. | |
| 5,304,289 A | 4/1994 | Hayakawa | |
| 5,304,302 A * | 4/1994 | Bossert | 210/222 |
| 5,738,766 A * | 4/1998 | Jefferson | 204/155 |
| 5,738,778 A | 4/1998 | Doring | |
| 6,203,710 B1 * | 3/2001 | Woodbridge | 210/695 |
| 6,238,546 B1 | 5/2001 | Knieper et al. | |
| 6,780,306 B1 * | 8/2004 | Schlager et al. | 205/701 |
| 2002/0056634 A1 * | 5/2002 | Pitts et al. | 204/164 |
| 2003/0164308 A1 | 9/2003 | Schlager et al. | |

OTHER PUBLICATIONS

M. Wagner, D. Brumelis, R. Gehr; Disinfection of Wastewater by Hydrogen Peroxide or Peracetic Acid: Development of Procedures for Measurement of Resides: Disinfectant and Application to a Physicochemically Treated Municipal Effluent; Water Environment Research, vol. 74, No. 1, Jan./Feb. 2002, pp. 33-45.

L. Scruggs, D. Richard, P. Govea, G. Tchobanoglous; Disinfecting Unfiltered Secondary Effluent Meeting the Challenge With Low Pressure—High Intensity UV Systems; Water Environment Federation, 2000, pp. 1-23.

H. P. Dhar; Electochemical Methods for the Prevention of Microbial Fonling; Prevention of Microbial Fonling, Chapter 22, pp. 593-606.

* cited by examiner

*Primary Examiner*—Arun S. Phasge
(74) *Attorney, Agent, or Firm*—Godfrey & Kahn, S.C.

(57) ABSTRACT

The present invention provides an electroionic processing system having a high frequency alternating current (AC) power source for treating potable water, process water, wastewater, biosolids, sludge, primary effluent, secondary effluent, and other biochemical processing functions, including producing hydrogen peroxide and other useful chemicals. An electromagnetic field is generated and coupled to an electrolytic treatment apparatus by a direct coupling apparatus and method, a capacitive coupling apparatus and method, and an inductive coupling apparatus and method. The present invention further comprises a process controller and a plurality of analyzers for monitoring various treatment process variables to adjust and optimize the process as necessary.

45 Claims, 9 Drawing Sheets

ELECTROIONIC PROCESSING SYSTEM

BACKGROUND OF THE INVENTION

The present invention relates generally to an electroionic processing system, and more particularly to an electroionic processing system having a high frequency alternating current (AC) power source for treating potable water, process water, wastewater, biosolids, sludge, primary effluent, secondary effluent, and other biochemical processing functions, including producing hydrogen peroxide and other useful chemicals.

Both potable water and wastewater contain microorganisms. Various water treatment systems are provided in the prior art for destroying bacteria and other microorganisms from potable water and disinfecting the water to a level suitable for human and animal consumption. Other water treatment systems treat wastewater by reducing the infectious components to levels which are not suitable for human or animal consumption, but are satisfactory for discharge into various water bodies. Similar water disinfection systems may be applied in both potable water and wastewater applications to reduce the microbial containment level to certain specified governmental standards. Historically, the use of chlorination for disinfection has been pervasive, and in recent years systems employing ultraviolet radiation and ozonation have been commercialized as well.

The treatment of wastewater does not provide water suitable for human consumption, either by drinking, use in cooking, washing of food products for consumption and the like. Rather, wastewater is defined by various public and governmental standards so as to permit discharge, when properly treated and disinfected, into relatively large bodies of water, such as rivers, lakes and oceans. Generally, wastewater treatment presently requires processing to meet the following basic content specifications: Total suspended solids less than 30 milligrams per liter (mg/l); biological oxygen demand (BOD) less than 30 mg/l; Fecal coliforms bacteria less than 200 colonies per 100 ml. Certain other specifications may also require removal of nitrogen, ammonia and phosphorous.

Wastewater treatment systems typically include an initial primary component involving both physical and chemical treatment to reduce suspended solid materials, a secondary component involving biological treatment of the wastewater to remove dissolved organic substances, followed by a third component to remove bacteria and/or other microbes. A final component involves one or more treatments of chlorination, ultraviolet radiation or ozonation.

Chlorine and its variants (chloramines and chlorine dioxide, etc.) are disinfectants added to drinking water to reduce or eliminate microorganisms, such as bacteria and viruses, which can be present in water supplies. However, chlorine also reacts with organic matter in the water to produce chlorination byproducts. The most common of these byproducts are trihalomethanes (THMs), which include chloroform. These byproducts have been shown to cause cancer and birth defects in children. Also, chlorination at non-toxic dosage levels, is not capable of inactivating Cryptosporidium, a major disease-causing parasite.

In wastewater treatment, chlorination must be followed by dechlorination using sulfur dioxide or an equivalent chemical to comply with discharge chlorine levels. This is a costly process. In addition, recent OSHA regulations have established tight controls for safe handling, storage and security of chlorine gas.

Ultraviolet Radiation (UV) is an alternative to chlorination. While UV disinfection systems offer the primary current alternative to chlorination, they also have serious limitations. In large-scale disinfection systems, they do not effectively provide the required disinfection. Also, in high turbidity water or wastewater, disinfection action is erratic and unpredictable due to absorption and scattering of the efficacious light. Small amounts of chlorine or other disinfectants still must be added.

Ozonation is a water treatment process that destroys bacteria and other microorganisms through an infusion of ozone, a gas produced by subjecting oxygen molecules to a source of energy. Ozone is one of the strongest oxidizing agents used to reduce odor and color, eliminate organic waste and reduce total organic carbon (TOC) in water. Ozonation is very effective for inactivating Cryptosporidium and other naturally occurring organisms. Ozonation also can reduce the formation of THMs, which result from the interaction of chlorine and naturally occurring organic material in the water. Although ozone is a very effective disinfectant, it breaks down quickly and cannot be used to maintain disinfection in a distribution system. Small amounts of chlorine or other disinfectants still must be added. Renovating water treatment plants so that they can use ozonation can be expensive. Ozonation systems are cost effective only in very large-scale water and wastewater treatment plants. Ozone also produces its own carcinogenic disinfection byproducts.

Various prior art electrochemical processing systems have also been used for disinfection and/or oxidation of potable water and wastewater. These prior art systems include electroporation and electrolytic systems.

Electroporation systems have been used for the inactivation of bacteria from water including wastewater. The technique is generally based on increasing cell membrane permeability using very high voltage electric fields. The water is passed through a disinfection unit having spaced electrodes which are connected to a high voltage source, generally on the order of kilovolts. The high electric field generated changes the permeability of microbial cells and creates a transient, reversible and/or a permanent and irreversible state of increased porosity. The transient condition usually arises at lower values of electric field intensities. The permanent and irreversible state thus is generally operable at much higher levels. Although such systems have been developed, the required high voltage power supply is very costly and also may raise serious safety problems. Electroporation disinfection systems also consume large amounts of electric power. Electroporation systems have disadvantages not only from the cost, but also from the practicality of the system as applied to large water utility and wastewater applications. Further, requirements for large flow cells within closed systems or open channels limit the current state of the art in electroporation systems.

Electroporation employs the use of high voltage pulsed or DC electric fields previously discussed for disinfection is practical only in small, point-of-use applications. For example, the use of prior art treatment with electric fields in the one to ten kilovolt per centimeter range extrapolates to tens, possibly hundreds of thousands of volts required using the water flow routes of existing treatment plants. At the treatment plant level, voltage values and power consumption are significantly large and raise concerns for both safety and cost effectiveness.

DC-based electroporation (Electric Arcing) employs high voltage pulses that destroy microbial cells by increasing cell porosity and permebiliy. DC-based electroporation is a high-voltage process. DC electroionics electrically generates hydrogen peroxide and other oxidizing agents with direct current-activated electrode action. Both of these DC techniques are characterized by efficient disinfection in small labaoratory-scale processes, inefficient disinfection in large-scale processes, and significant electrode contamination after prolonged operation. Both technologies are not efficient or cost-effective in large-scale plant-size operations.

Electrolytic syetems employ electrolytic cells that rely on the use of toxic metal electrodes which increase metal concentrations in aqueous solution that sometimes exceed maximum contamination levels for silver, copper, lead or other metals. This toxicity problem has been generally ignored or presented generally without a proper basis for solving the problem particularly in high flow rate systems by most of the prior art, except for U.S. Pat. No. 3,936,364, which provides a second electrolytic cell to remove the toxic metal. The '364 patent, however, does not establish that such metal removal could be accomplished in a cell of reasonable and cost effective size, particularly in high flow rates systems.

The prior art electromagnetic field approaches to wastewater disinfection and/or organics oxidation have failed to achieve the required efficiency levels in large-scale disinfection operations. DC-based systems are also susceptible to electrode contamination. Electroporation systems have found use only in limited, point-of-use applications where small pipe diameters are the rule. However, commercially applicable systems for water treatment plants and large-scale wastewater processing have not found significant application.

Alternate systems based on ionic current flow within water have been used, particularly for limited flow systems such as swimming pools and other like bodies. These systems, however, use metals such as zinc, copper, lead, silver or the like which introduce toxic ions into the water. This approach raises further questions or acceptability and compliance with federal and state chemical contamination limits.

In summary, the prior art has considered the problems of disinfecting water with various electroporative or ionic processes to establish a level acceptable for human or animal consumption and of wastewater for discharge into large bodies of water. It is submitted that such suggested systems cannot operate at the flow rate in channel or pipe sizes required for municipal water/wastewater treatment plants or other high volume applications. Further, the prior ionic disinfection art has universally relied on metal electrodes which introduce undesirable and significant toxic metals into the treated water system, and particularly systems which would not function practically in the channel or pipe sizes at the high rates of flow encountered in modern day community water and wastewater treatment systems.

Therefore, a need exists for a disinfection and oxidation system for both potable water and for wastewater which is operable to remove bacteria and other microorganisms from water and wastewater, which is operable at high rates of flow as encountered for commercial and community water supplies as well as various sizes of wastewater treatment systems.

SUMMARY OF THE INVENTION

The present invention provides an electroionic processing system that generates an electromagnetic field from a high frequency AC power source for chemical oxidation, microbiological disinfection, disinfection of secondary effluent wastewater, biosolids processing, biological oxygen demand (BOD) reduction of primary effluent, and reduction of E. coli levels in water and wastewater. Electroionics is a physical chemical process in which electrons, ions and molecules combine in a water solution to generate chemical compounds useful in microbial disinfection, oxidation and other chemical processes.

The present invention provides a particularly useful form of electroionics, which employs high frequency electromagnetic fields for electroionic processing. Such high frequency electromagnetic fields provide more efficient electroionic and chemical reactions that are more widely distributed in the aqueous solution.

The present invention includes a high frequency alternating current (AC) power source that generates an electromagnetic field in an electrolytic cell. The electromagnetic field may be coupled in the electrolytic cell by a direct coupling method, a capacitive coupling method, or an inductive coupling method. The technology has been demonstrated in the electrochemical disinfection of wastewater effluent and wastewater residual (also known as sludge or biosolids). It has also been demonstrated in the oxidation of organic compounds in both municipal and industrial wastewater treatment. The technology has also been demonstrated in the removal of organic and inorganic contaminants in recycled paper pulp.

The present invention comprises a treatment apparatus, a high frequency AC power source, a process controller, and a plurality of analyzers for monitoring various treatment process variables to adjust the process as necessary. These process variables must be monitored for the process to be optimized. Some of the process variables that are monitored include the microbial content in the aqueous solution, the amount of hydrogen peroxide in the aqueous solution, and the conductivity of the aqueous solution. Other important variables that may be monitored include the electromagnetic field strength generated by the process, the amount of dissolved oxygen in the aqueous solution, the amount of iron in the aqueous solution, the pH of the aqueous solution, and the hydrogen peroxide decay time.

The embodiments of the present invention include a direct-coupled embodiment, a capacitively-coupled embodiment, and an inductively-coupled embodiment. The direct-coupled electroionic processing embodiment comprises a high frequency AC power source, a treatment cell, at least two treatment electrodes, a process controller, and a plurality of analyzers coupled to the treatment cell. The electrodes may be stainless steel, Teflon® coated copper or other suitable material. The apparatus also includes a current feedback loop to sense current.

The high frequency AC-based direct electroionic process does not result in electrode contamination from the plating action experienced in DC electrolytics. DC electrolytrics also suffers from electrode fouling as a result of the wastewater environment. Various suspended solid materials will adhere to the electrode surface diminishing their efficiency over time. In the AC-based high frequency system of the present invention, it is possible to provide suitable stainless steel finishes and/or shield the electrode with Teflon® or other dielectric coatings.

The capacitively-coupled electroionic processing embodiment comprises a high frequency AC power source, a treatment cell, at least two treatment electrodes, a process controller, and a plurality of analyzers coupled to the treatment cell. The electrodes are preferably Teflon® coated copper or other suitable material. The Teflon® coating provides a dielectric medium for protection against corrosion as well as providing a low coefficient of friction. The apparatus also includes a current feedback loop to sense current.

The inductively-coupled electroionic processing embodiment comprises a high frequency AC power source, a treatment cell, at least one coil, a process controller, and a plurality of analyzers coupled to the treatment cell. The equivalent circuit is a resonant LCR circuit that includes an inductor (the coil), a capacitor and resistor (stray resistance of coil and/or capacitor). The apparatus also includes a current feedback loop to sense current and to keep the circuit tuned, because it is a fairly high Q resonant circuit.

The direct and capacitively-coupled electroionic processing embodiments preferably include at least two electrodes, but may include a plurality of electrodes. The direct and capacitively-coupled electroionic processes have a number of advantages in certain size installations. The electric power efficiency is good for small and medium-sized water and wastewater treatment plant installations. In small to medium water and wastewater treatment plant installations, the direct and capacitively-coupled electroionic processes have lower capital costs than the inductive electroionic process method. The direct and capacitively-coupled electroionic processes also are simpler in both concept and operation than the inductively-coupled electroionic process. The inductively-coupled electroionic process has a number of advantages in larger-sized water and wastewater treatment plant installations.

The present invention provides disinfection and oxidation of potable water, process water, wastewater, biosolids, sludge, primary effluent, and secondary effluent. Organic content of aqueous solutions are lowered through oxidation. The processes of the present invention involve disinfection, oxidation of organics and inorganics, lowering of BOD, chemical oxygen demand (COD), and total organic carbon (TOC). The present invention also provides for other biochemical processing functions, including producing hydrogen peroxide, hydroxyl radicals and other useful chemicals. Hydrogen peroxide, a well known disinfectant, is a major component of the present invention and also a major byproduct of the present invention. If hydrogen peroxide is generated, most organic and some inorganic materials are oxidized.

The present invention also includes process control by measuring microbial content, hydrogen peroxide and conductivity of the aqueous solution being treated by an on-line microbial analyzer, a $H_2O_2$ analyzer and a conductivity analyzer that are inputs to a process controller for adjusting the power level of the high frequency AC power supply that affect the electric field produced and the hydrogen peroxide generated based on the conductivity of the aqueous solution being treated. The higher the conductivity compared to the amount of power put in, the more effect you have because the current density generated is proportional to the strength of the field and the conductivity. Wastewater has a high conductivity. Biosolids have a higher conductivity. Potable waster has a lower conductivity. The present invention also allows for measurement of dissolved oxygen, COD, TOC and BOD (off-line) of the aqueous solution being treated. COD, TOC and BOD are measurements of organic material in the aqueous solution being treated.

Various other features, objects, and advantages of the invention will be made apparent to those skilled in the art from the following detailed description, claims, and accompanying drawings.

DETAILED DESCRIPTION OF THE INVENTION

Figure 1:
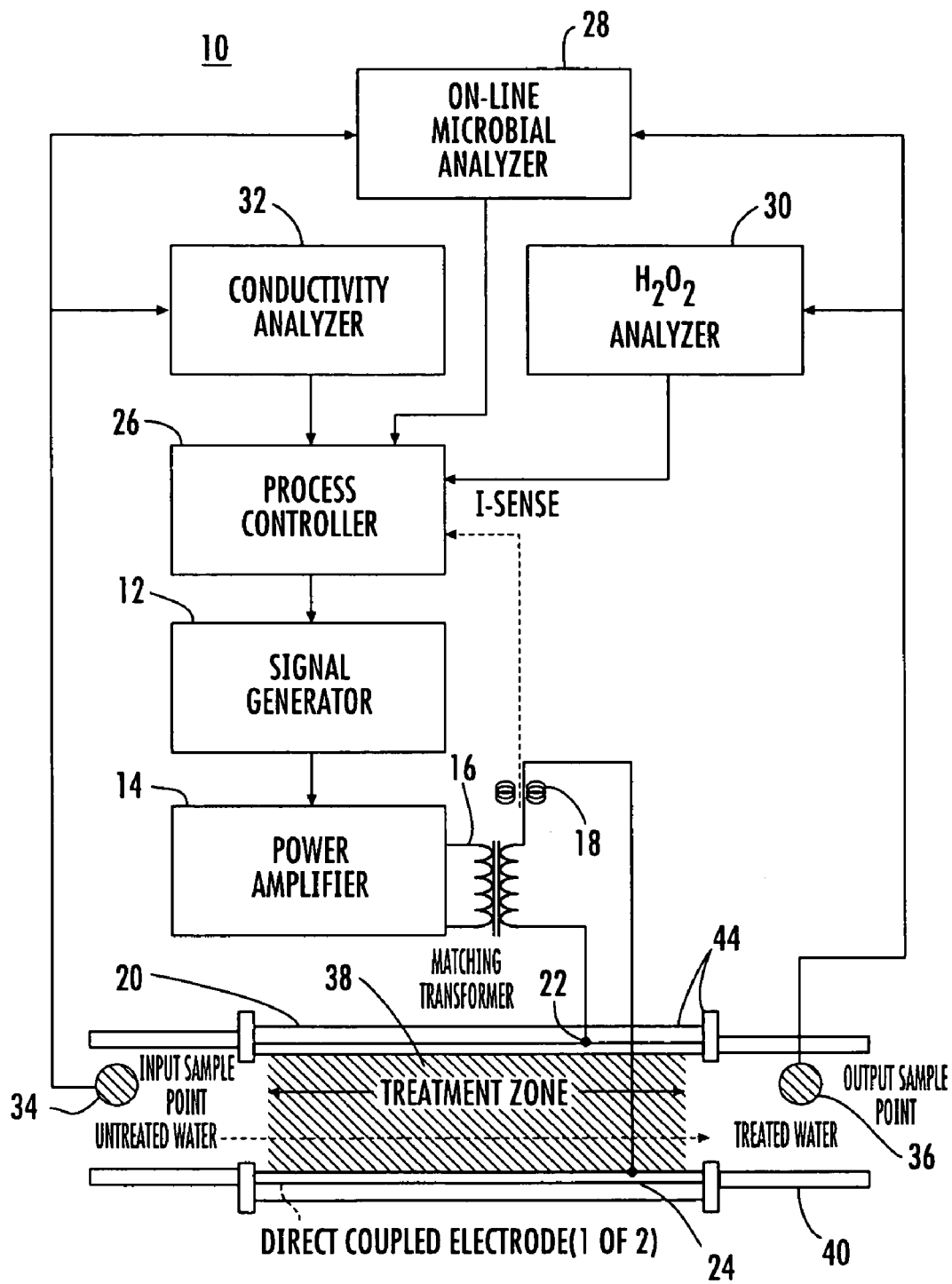
FIG. 1 is a block diagram of a direct-coupled electroionic processing system in accordance with an embodiment of the present invention.

Referring to the drawings and particularly to FIG. 1, a block diagram of a direct-coupled electroionic processing system 10 in accordance with an embodiment of the present invention is shown. The direct-coupled electroionic processing system 10 comprises a high frequency AC power source 12, 14, a treatment cell 20, at least two treatment electrodes 22, 24, a process controller 26, an on-line microbial analyzer 28, a hydrogen peroxide ($H_2O_2$) analyzer 30 and a conductivity analyzer 32. A signal generator 12 supplies a high frequency (20 kHz–450 kHz) signal which is power amplified by a power amplifier 14 for input to an impedance matching transformer 16. Most high frequency power amplifiers require an impedance load of 50 ohms. A current sense coil 18 is also provided to signal the process controller 26 on the current level in the circuit. The current supplied to the treatment cell 20 preferably adapts to varying microbial loads, as detected by the on-line microbial analyzer 28. The current adjustment minimizes the power consumption; and thereby the power costs based on the on-line measurements of bacteria and other microorganisms in the aqueous solution to be treated. The on-line microbial analyzer 28 measures the change in microbial count levels between an input sample point 34 (untreated water) and an output sample point 36 (treated water). While this instrumentation is not necessary for cost-effective wastewater disinfection, it does reduce power usage costs by adjusting power levels to changing microbial loads (coliform counts). It also continually insures that the system is performing its disinfection function.

The treatment cell 20 preferably includes a metal frame 44 with electrodes 22, 24 just inside the metal frame 44, and a PVC tube 40 that fits around the frame. The electrodes 22, 24 are preferably made of stainless steel or other material that is corrosion resistant and has a low coefficient of friction. Stainless steel electrodes provide a low cost and highly effective disinfection cell. Stainless steel electrodes do not introduce any damaging toxic ions into the water and operate at reasonably low voltages and currents. The use of stainless steel in an electrolytic configuration generates hydrogen peroxide and hydroxyl radical disinfectants. The electrodes are readily formed with an appropriate area and operable at relatively low current densities such as 20–40 milliamperes/cm$^2$ to obtain a relatively high reduction in bacteria.

The electrodes 22, 24 form the inner wall of the treatment cell 20. Each electrode 22, 24 is a flat plate having dimensions corresponding to a pipe or open channel configuration. The length of the electrodes is selected in accordance with the maximum flow rate of the water to be processed, the conductivity of the water and the necessary contact time. The disinfection process is the result of the generation of hydrogen peroxide and hydroxyl radicals, which act as oxidizing agents. The electrode length establishes the contact time available for any given flow rate. With the high flow rates of the various drinking water and wastewater treatments, sufficient current density is required to accomplish the required level of disinfection. As noted previously, the contact time required is dependent upon the current density level within the cell and the degree of disinfection needed. The electrode length 26 is therefore based on the flow rate and the necessary current density available.

The generation of hydrogen peroxide and other chemicals is an inherent byproduct of the electroionic process of the present invention and responsible for the oxidation and disinfection functions performed.

The chemical reaction formulas listed below provide an example of such processes for the production of hydrogen peroxide and hydroxyl radicals used in water and wastewater disinfection and oxidation of organic and inorganic materials.

Chemical Reaction for Hydrogen Peroxide Generation:
$O_2 + 2H_2O + 2e^- \rightarrow H_2O_2 + 2OH^-$ for an alkaline media
$O_2 + 2H^+ + 2e^- \rightarrow H_2O_2$ for an acid media Electrons and ions are combined to produce hydrogen peroxide.

Biosolids are generally acidic, below a pH of seven, so the second formula would hold for biosolid applications.

The generation of hydrogen peroxide is the primary vehicle for disinfection of microorganisms in wastewater and potable water. The generation of hydrogen peroxide is generated over the full operational pH range and is a reliable and dependable agent of water and wastewater disinfection.

To be effective as a disinfection or oxidation process, hydrogen peroxide must not only be generated, but controlled. The highest voltage and current do not provide the most efficient $H_2O_2$ production. An optimal voltage for hydrogen peroxide generation exists for a given set of water parameters. Control of the level of hydrogen peroxide generated is very important depending upon the water and wastewater treatment application. In applications such as sludge where long post-treatment storage times are the rule, lower levels of hydrogen peroxide will produce a lower, long term level of microbial content with a hydrogen peroxide residual. Other applications such as disinfection of secondary effluent wastewater or organic oxidation for COD/BOD reduction will require a higher concentration of hydrogen peroxide for quick action and without leaving a hydrogen peroxide residual.

Higher or lower excitation voltages and resulting field strengths will be less efficient producers of $H_2O_2$. Furthermore, control of the level of $H_2O_2$ generated is very important depending on the water and wastewater treatment application. In applications such as sludge wastewater where long post-treatment storage times are the rule, lower levels of $H_2O_2$ will produce a lower, long term level of microbial content with an $H_2O_2$ residual. Other applications such as disinfection of secondary effluent wastewater or organic oxidation for COD/BOD reduction will require a higher concentration of $H_2O_2$ for quick action and without leaving an $H_2O_2$ residual.

Chemical Reaction for Hydroxyl Radical Generation—Fenton's Reagent—Lower pH Environment:
$F_e \rightarrow F_e^{2+} + 2e^-$
$H_2O_2 + F_e^{2+} \rightarrow F_e^{3+} + \cdot OH + OH^-$ Hydroxyl radicals are generated only in limited pH ranges and in the presence of ferrous iron ($F_e^{2+}$). Such hydroxyl radicals are, therefore, not a reliable and dependable agent for disinfection action but only an add-on "bonus" factor when specified water and wastewater conditions or pH and iron content are present. Hydrogen peroxide ($H_2O_2$), in contrast, is generated over the full operational pH range and is, therefore, a reliable and dependable agent of water and wastewater disinfection.

Biosolids also have a high iron content, creating a Fenton's Reagent reaction.

The present invention also provides for the generation of chlorine or bleach. The chemical reaction for chlorine generation and hypochloric acid (bleach), which are also byproducts of the invention are defined as:
$Cl^- \rightarrow \frac{1}{2}Cl_2 + e^-$
$Cl_2 + H_2O \rightarrow HOCl + HCl$ The current density level and the contact time of the aqueous solution to the electrodes are important factors in the present invention. The electrodes should be formed having a significant length in the direction of flow to produce the required contact time and reduce the necessary current level in order to produce an adequate disinfection for practical applications. The use of a stainless steel electrodes is considered to provide a very high rate if disinfection in the aqueous solution from a community supplied water or wastewater treatment system having the usual flow rate of such systems. The current density range may vary with the application within a range of substantially 0.2 to 50 ma/cm$^2$ in various systems within the scope of the present invention.

The process controller 26 receives inputs from the current sense feed back loop 18, the on-line microbial analyzer 28, the $H_2O_2$ analyzer 30 and the conductivity analyzer 32 for controlling the signal generator 12. The process controller 26 evaluates this input data and regulates the power amplifier 14 to optimize results with minimum energy costs, limit operational decisions, and perform watchdog functions, such as looking for failure conditions, empty treatment zone, etc. Additionally, the process controller 26 preferably includes reporting functions as well.

The on-line microbial analyzer 28 receives inputs from the input sample point 34 and output sample point 36 of the treatment zone 38 for output to the process controller 26.

Figure 12:
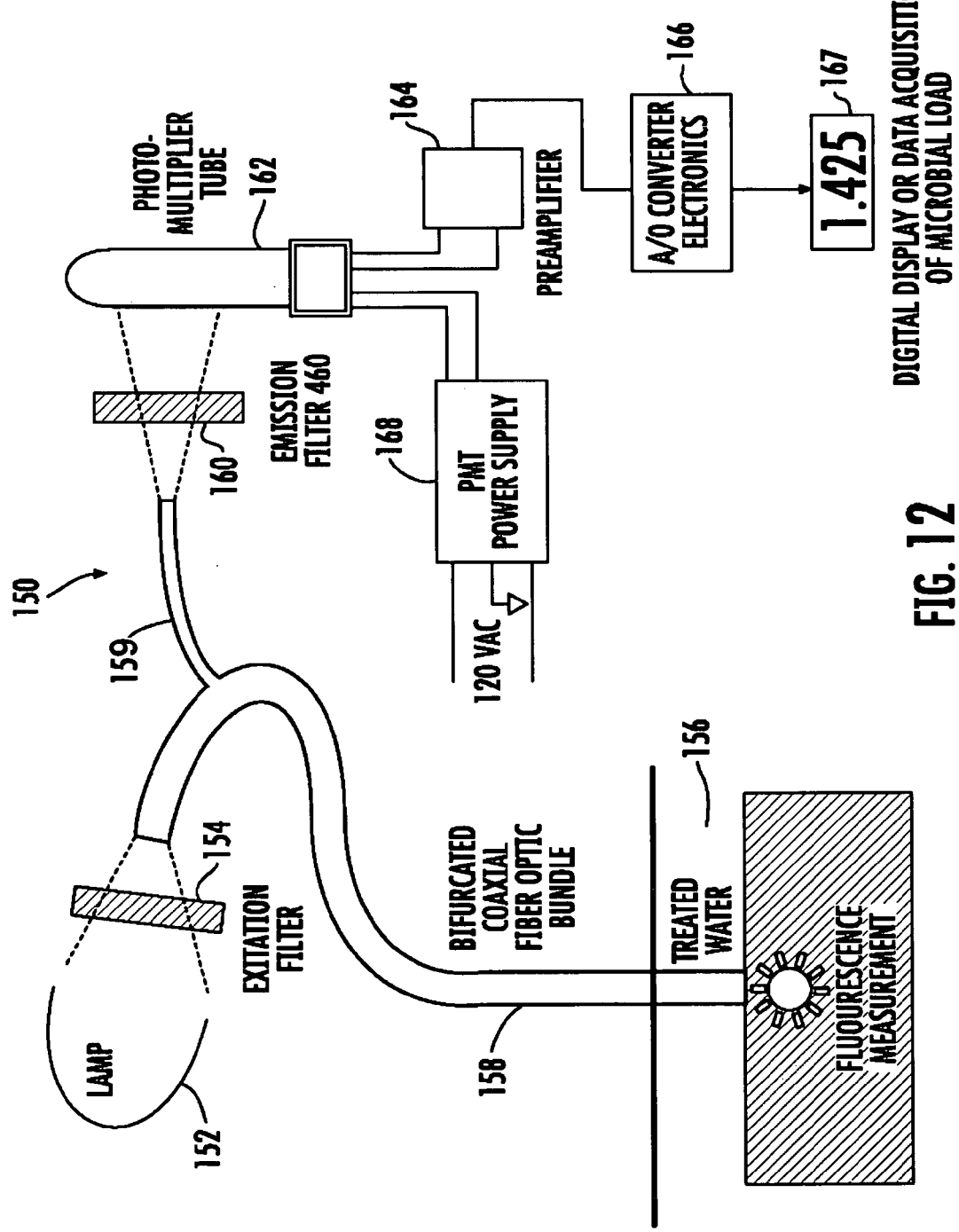
FIG. 12 is a block diagram of an embodiment of an on-line microbial analyzer that may be used in the present invention.
Figure 13:
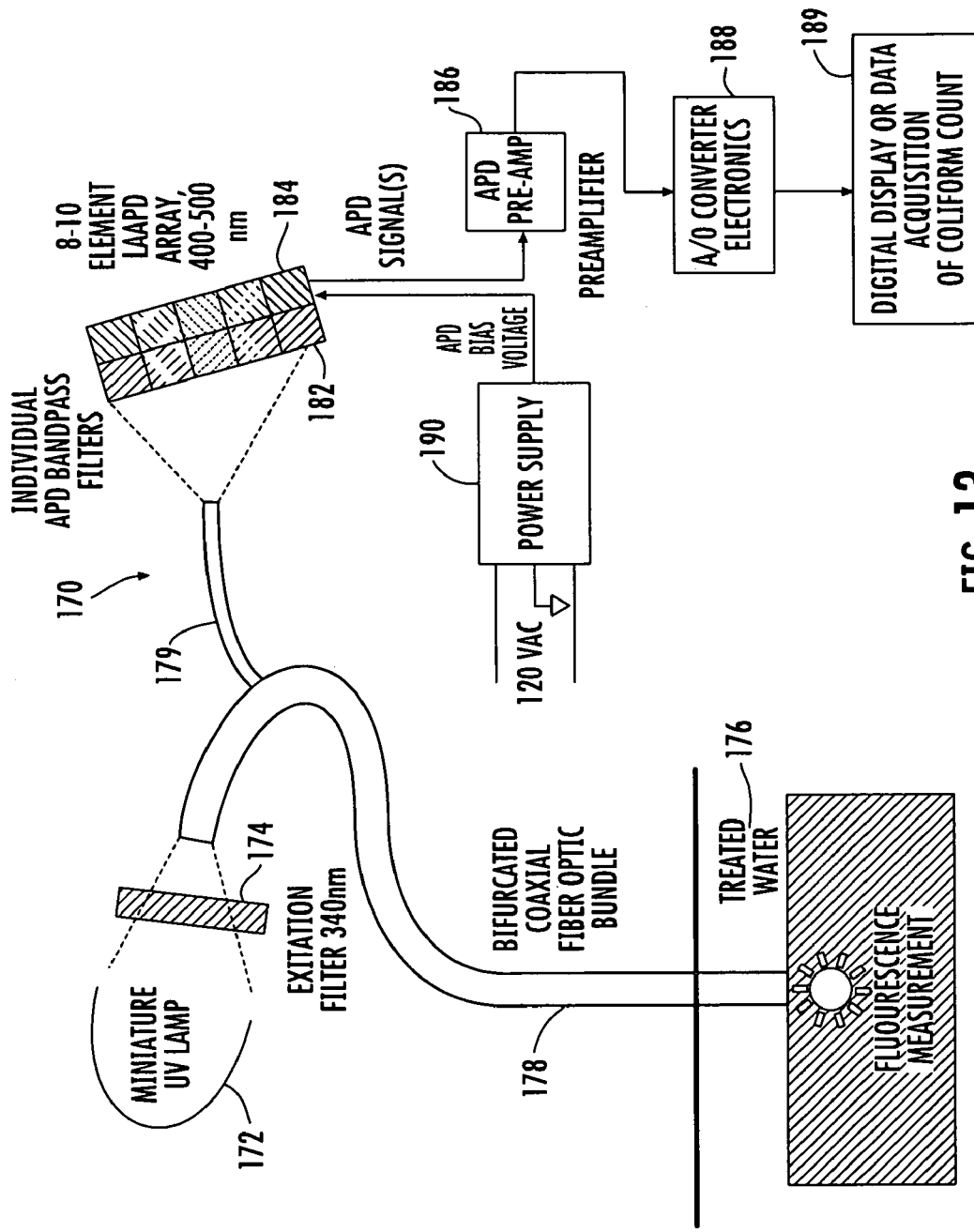
FIG. 13 is a block diagram of another embodiment of on-line microbial analyzer that may be used in the present invention.

The on-line microbial analyzer 28 functions to maintain control of the disinfection process. By measuring the outcome of the process (disinfection), the monitor is able to adjust the input voltage and resulting field strength to optimize the disinfection process. Without such process control, effective water and wastewater disinfection or oxidation is not possible. The microbial analyzer 28 is an on-line instrument capable of measuring and controlling a process in real-time. Diagrams of two embodiments of on-line microbial analyzers are shown in FIGS. 12 and 13.

The on-line microbial analyzer 28 provides an indication of the total microbial population density of the aqueous solution being treated. This density in turn is a measure of the microbial contamination of the aqueous solution based on the known relationship between nicotinamide adenine dinucleotide (NADH) fluorescence and microbial population density. The microbial analyzer 28 is preferably coupled to the process controller 26 which controls field strength and current density. As the aqueous solution flows through the treatment zone 38, the aqueous solution is subjected to the electroionic treatment established by the energization of the electrodes 22, 24 and the conductivity of the aqueous solution. The biocidal effect of the ionic treatment generated within the aqueous solution on the bacteria effectively destroys or inactivates such bacteria and other microorganisms or at least reduces the level to that which is acceptable to drinking water. Alternatively, it will treat wastewater similarly to reduce microbial contamination to a level permitting direct discharge into a receiving body of water. Measuring the biochemical compound NADH not only indicates the presence and population density of bacteria, but also their life status (alive or dead) which is the measurement required for electroionic process control.

The conductivity analyzer 32 receives an input from the input sample point 34 of the treatment zone 38 to measure the conductivity of the aqueous solution and provide an output to the process controller 26 for controlling the signal generator 12 and power amplifier 14. Higher levels of conductivity allow for lower power levels to achieve the same current density.

The hydrogen peroxide analyzer 30 receives an input from the output sample point 36 of the treatment zone 38 to measure the amount of hydrogen peroxide in the aqueous solution and provide an output to the process controller 26 for controlling the signal generator 12 and power amplifier 14. The hydrogen peroxide level determines the rate of disinfection.

Figure 2:
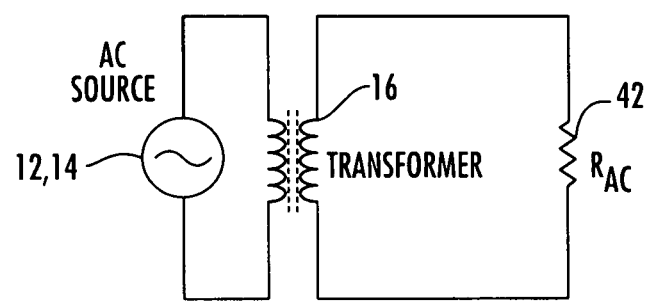
FIG. 2 is a simplified schematic circuit representation of the direct-coupled electroionic processing system of FIG. 1.

FIG. 2 is a simplified schematic circuit representation of the direct-coupled electroionic processing system of FIG. 1. The AC power source 12, 14 preferably provides a high frequency sinusoidal waveform with a frequency in the range of 20 kHz to 450 kHz that creates an electromagnetic field around the treatment cell 20. The equivalent circuit element for the treatment cell 20 and treatment zone 38 is a resistor 42 that represents the resistance of the water.

Figure 3:
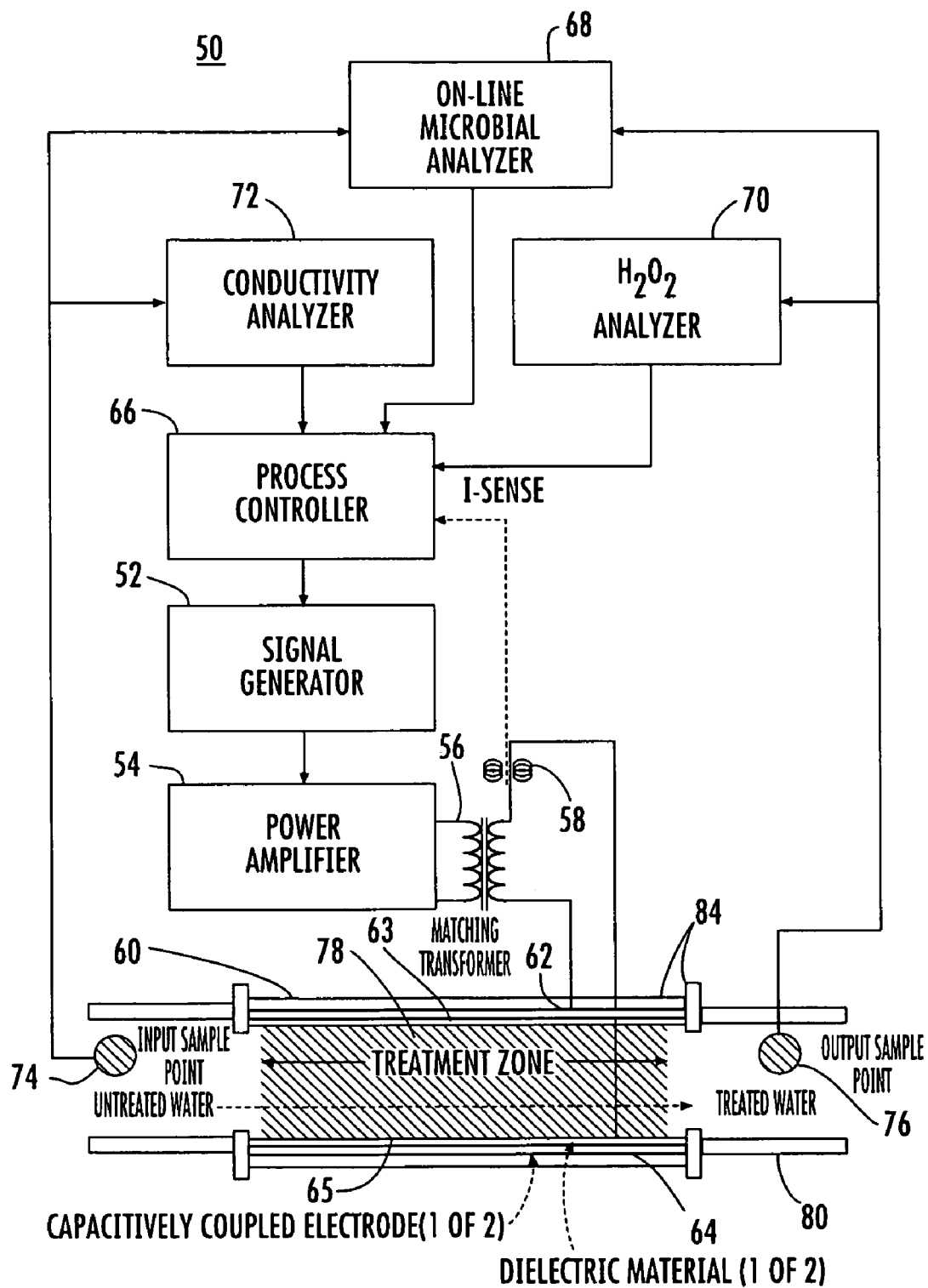
FIG. 3 is a block diagram of a capacitively-coupled electroionic processing system in accordance with another embodiment of the present invention.

FIG. 3 is a block diagram of a capacitively-coupled electroionic processing system 50 in accordance with another embodiment of the present invention. The capacitively-coupled electroionic processing system 50 comprises a high frequency AC power source 52, 54, a treatment cell 60, at least two treatment electrodes 62, 64 with a dielectric material 63, 65 on one surface of each electrode 62, 64, a process controller 66, an on-line microbial analyzer 68, a hydrogen peroxide ($H_2O_2$) analyzer 70 and a conductivity analyzer 72. A signal generator 52 supplies a high frequency (20 kHz–450 kHz) signal which is power amplified by a power amplifier 54 for input to an impedance matching transformer 56. The capacitively-coupled electroionic processing system 50 includes at least two capacitors that capacitively-couple the signal to the load. A current sense coil 58 is also provided to signal the process controller 66 on the current level in the circuit. The process controller 66 will adjust the power based on the inputs from the on-line microbial analyzer, the conductivity analyzer, and the $H_2O_2$ analyzer. The current supplied to the treatment cell 60 preferably adapts to varying microbial loads, as detected by the on-line microbial analyzer 68. The current adjustment minimizes the power consumption; and thereby the power costs based on the on-line measurements of bacteria and other microorganisms in the aqueous solution to be treated. The on-line microbial analyzer 68 measures the change in microbial count levels between an input sample point 74 (untreated water) and an output sample point 76 (treated water). While this instrumentation is not necessary for cost-effective water and wastewater disinfection, it does reduce power usage costs by adjusting power levels to changing microbial count levels. It also continually insures that the system is performing its disinfection function.

The only difference between the direct-coupled embodiment and the capacitively-coupled embodiment is that the electrodes for the capacitively-coupled embodiment are coated with a dielectric material provides capacitive coupling rather than direct coupling to the load. The treatment cell 60 preferably includes a metal frame 84 with electrodes 62, 64 just inside the metal frame 84, and a PVC tube 80 that fits around the frame. The electrodes 62, 64 are preferably coated on the surface closest the treatment zone 78 with a dielectric material 63, 65. The dielectric coating 63, 65 provides protection against corrosion as well as providing a low coefficient of friction. The dielectric coated 63, 65 electrodes 62, 64 form the inner wall of the treatment cell 60. The preferred dielectric material is Teflon®.

The process controller 66 receives inputs from the current sense feed back loop 58, the on-line microbial analyzer 68, the $H_2O_2$ analyzer 70 and the conductivity analyzer 72 for controlling the signal generator 52. The process controller 66 evaluates this input data and regulates the signal generator power to optimize results with minimum energy costs, limit operational decisions, and perform watchdog functions, such as looking for failure conditions, empty treatment zone, etc. Additionally, the process controller 66 preferably includes reporting functions as well.

The on-line microbial analyzer 68 receives inputs from the input sample point 74 and output sample point 76 of the treatment zone 78 for output to the process controller 66. The on-line microbial analyzer 68 functions to maintain control of the disinfection process. By measuring the outcome of the process (disinfection), the monitor is able to adjust the input voltage and resulting field strength to optimize the disinfection process. Without such process control, cost effective water and wastewater disinfection or oxidation is not possible.

The conductivity analyzer 72 receives an input from the input sample point 74 of the treatment zone 78 to measure the conductivity of the aqueous solution and provide an output to the process controller 66 for controlling the signal generator 52 and power amplifier 54. The power is adjusted to maintain a constant conductivity.

The hydrogen peroxide analyzer 70 receives an input from the output sample point 76 of the treatment zone 78 to measure the amount of hydrogen peroxide in the aqueous solution and provide an output to the process controller 66 for controlling the signal generator 52 and power amplifier 54. The hydrogen peroxide level is monitored continuously by the analyzer.

Figure 4:
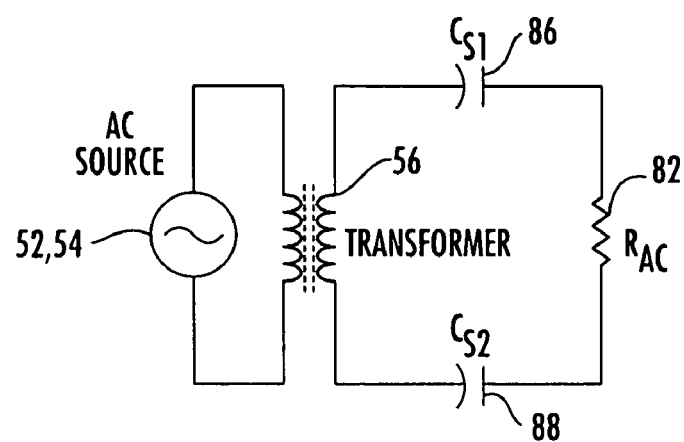
FIG. 4 is a simplified schematic circuit representation of the capacitively-coupled electroionic processing system of FIG. 3.

FIG. 4 is a simplified schematic circuit representation of the capacitively-coupled electroionic processing system 50 of FIG. 3. The AC power source 52, 54 preferably provides a high frequency sinusoidal waveform with a frequency in the range of 20 kHz to 450 kHz that creates an electromagnetic field around the treatment cell 60. The equivalent circuit element for the treatment cell 20 and treatment zone 38 is a pair of capacitors 86, 88 in series with a resistor 82.

Figure 5:
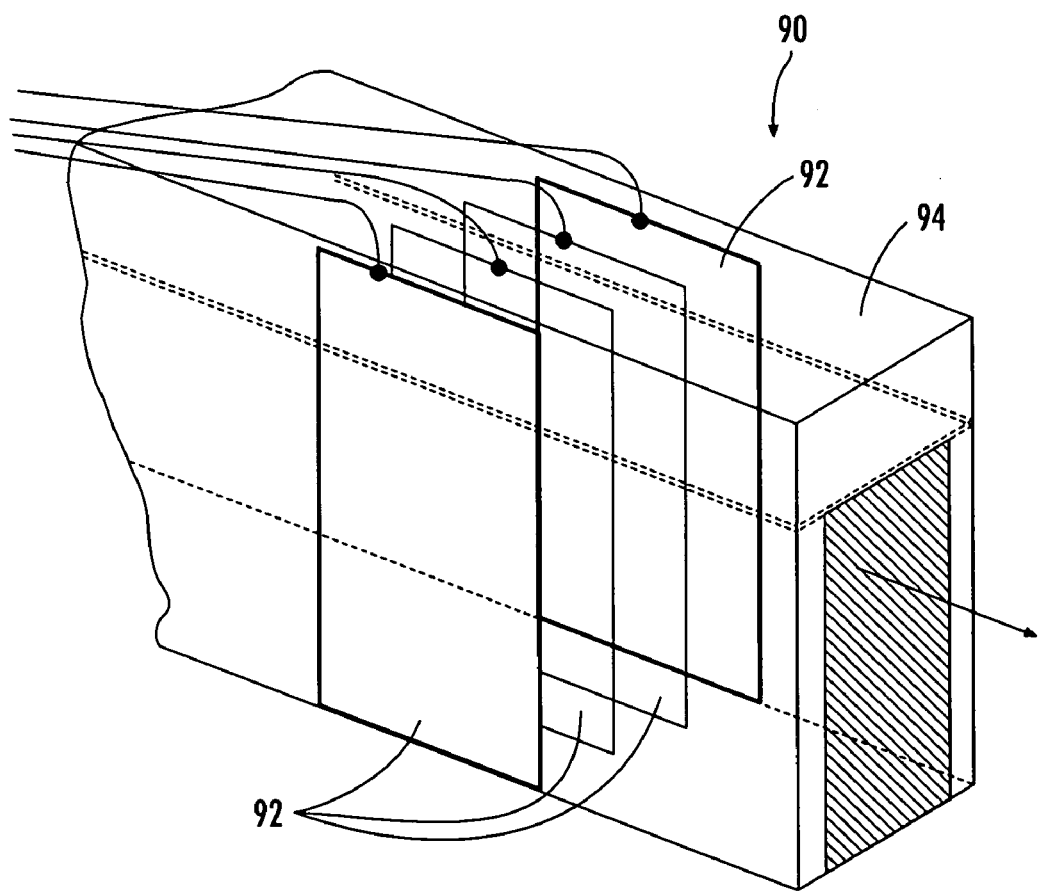
FIG. 5 is a diagram of a multiple plate flow cell assembly for use with the direct and capacitively-coupled electroionic processing system embodiments of the present invention.

The direct 10 and capacitively-coupled 50 electronic processing systems preferably include at least two electrodes, but may include a plurality of electrodes 92 as shown in FIG. 5. FIG. 5 is a diagram of a treatment cell 94 with a plurality of electrodes 92 for use with the direct 10 and capacitively-coupled 50 electroionic processing systems of the present invention. FIG. 5 illustrates a typical wastewater flow cell 90 with the electrodes 92 in place in the treatment cell 94. The electrodes 92 may also include dielectric material coating at least one surface of the electrodes.

A capacitor is formed by the electrode and dielectric on each side of the electrode. One capacitor for each electrode/dielectric interface. The resistance is the resistance of the water between the electrodes.

Figure 6:
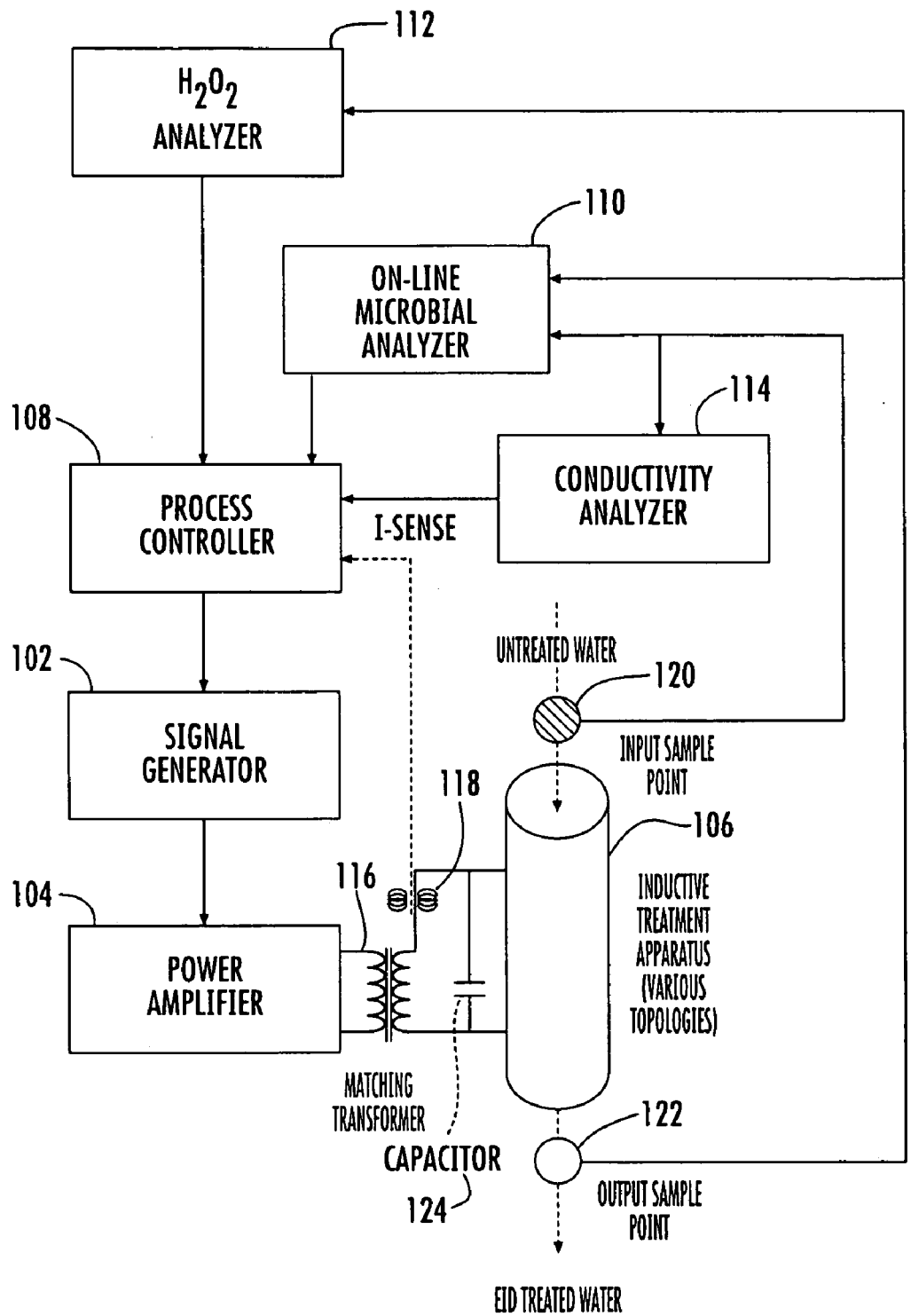
FIG. 6 is a block diagram of an inductively-coupled electroionic processing system in accordance with yet another embodiment of the present invention.

FIG. 6 is a block diagram of an inductively-coupled electroionic processing system 100 in accordance with yet another embodiment of the present invention. The inductively-coupled electroionic processing system 100 comprises a high frequency AC power source 102, 104, an inductive treatment apparatus 106, a process controller 108, an on-line microbial analyzer 110, a hydrogen peroxide ($H_2O_2$) analyzer 112 and a conductivity analyzer 114. A signal generator 102 supplies a high frequency (20 kHz–450 kHz) signal which is power amplified by a power amplifier 104 for input to an impedance matching transformer 116. The equivalent circuit for this embodiment is a series resonant LCR circuit, FIG. 11, which includes an inductor (the coil) 126, a capacitor 124, and a resistor (stray resistance of coil and capacitor) 128. The input impedance to the LCR circuit varies with the application, so that a matching transformer 116 is required to match the circuit elements of the treatment apparatus 106. A current sense coil 118 is also provided to signal the process controller 108 on the current level in the LCR circuit. The process controller 108 will adjust the frequency of the signal generator 102 until minimum current in the circuit is achieved. The current supplied to the treatment apparatus 106 preferably adapts to varying microbial loads, as detected by the on-line microbial analyzer 110. The current adjustment minimizes the power consumption; and thereby the power costs based on the on-line measurements of bacteria and other microorganisms in the aqueous solution to be treated. The on-line microbial analyzer 110 measures the change in microbial count levels between an input sample point 120 (untreated water) and an output sample point 122 (treated water). While this instrumentation is not necessary for cost-effective water and wastewater disinfection, it does reduce power usage costs by adjusting power levels to changing microbial count levels. It also continually insures that the system is performing its disinfection function.

Advantages of the inductively-coupled method include that there is no contact of the coil and core with the aqueous solution, whereas the direct and capacitively-coupled method each have electrodes in contact with the treatment solution. Also, the inductively-coupled apparatus is better suited for larger installations, because the bigger the radius of the coil, the bigger the field generated, thus the more hydrogen peroxide generated for better treatment.

The following three basic electromagnetic formulas provide the foundation for the inductively-coupled electroionic processing system:

1. Solenoid Coil Flux Density: $B=\mu NI/l$
   B=flux density (Tesla)
   $\mu$=permeability of medium (henrys/meter)
   N=number of turns on solenoid (dimensionless)
   I=current (amperes)
   l=length of solenoid (meters)
2. Induced Electric Field: $E=\pi fBR \cos 2\pi ft$
   E=electric field (volts/meter)
   $f$=frequency of AC field (Hertz)
   B=flux density (Tesla)
   R=radius of electric field (meters)
   t=time (seconds)
3. LCR Circuit Resonance: $X_L=X_C$
   $X_L$=inductive reactance
   $X_C$=capactive reactance
   Resonant Frequency: $f_o=1/2\ \pi(LC)^{1/2}$
   Current: $I=V/R$
   V=output of matching transformer (volts)
   R=resistance of series resonant circuit In order to relate the effect of the AC field to the disinfection process, it is also necessary to determine the current density (J).

$J=E\sigma$
J=current density ($ma/cm^2$)
E=electric field strength (mv/cm)
$\sigma$=conductivity of water or wastewater (Siemens/cm)

A sample set of circuit parameter values was calculated for operation at 400 kHz with a 4.5 inch diameter coil.

l=0.411 meters=16.18 inches
N=300 turns
I=14.37 amps
B (from formula)=$1.312 \times 10^{-2}$ Tesla
R=$5.7 \times 10^{-2}$ meters
E=939.7 volts/meter=9.397 mv/cm
$\sigma=2.4 \times 10^{-3}$ S/cm
J=22.55 $ma/cm^2$ Having determined the induced current density of the electric field, it is necessary to calculate the circuit parameters of the resonant circuit and the matching transformer.

There are two approaches to determining coil inductance (L):

1. By an approximate formula: $L=N^2\ \mu A/l$
   A=cross sectional area of coil
   Other parameters were previously defined.
2. By measurement:

Using the above formula for the 4.5 inch coil, the calculated L=2.809 millihenries.

Using the Hewlett-Packard Model 4800A Vector Impedance, the inductance was measured as L=2.550 millihenries.

This measured value was used for the LCR circuit design. The inductive reactance at 400 kHz is then determined by $X_L=2\pi fL$. For f=400 kHz, $X_L$=6409 ohms and $X_c$=6409 ohms.

The capacitor value in the circuit is then determined by $C=1/2\ \pi fX_c$
C=62.1 picofarads The input current ($I_{in}$) to the circuit is determined by the inductance and AC resistance of the circuit.

$Q=X_L/R_{ac}$
$I_{in}=I_{tank}/Q$
$I_{in}$=5.36 ma for $R_{ac}$=2.39 ohms—Theoretical value.

$I_{in}$=14.28 ma for $R_{ac}$=6.37 ohms—Extrapolated experimental value.

$I_{in}$=22.40 ma for $R_{ac}$=10.0 ohms—Upper limit value.

The value of $R_{ac}$ was determined by formula and measurement. The formula (Dartmouth/Sullivan) is: $F_r=1+(\pi^2\omega^2\mu N^2 n^2 d_c k/768\rho_c^2 b_c^2)$ Where $\omega$=in radians frequency n=number of Litz wire strands N=number of coil turns $d_c$=diameter of copper in each strand k=1 constant $\rho_c$=resistivity of copper $b_c$=window area breadth Resulted in $F_r$ essentially equal to 1.0 indicating that $R_{ac}=R_{dc}=2.4$ ohms.

Power efficiency may be maintained through the use of an impedance matching transformer. At the same level of power usage, voltage may be increased by lowering the current level as controlled by the turns ratio of the transformer. Field strength depends on voltage, not current. A power generator with a high output impedance will produce a higher voltage level for the same power input in accordance with $P=V^2/R$.

The turns ratio on the impedance-matching transformer depends on the Q of the resonant circuit which in turn depends on:

1. Inductive reactance ($X_L$)
2. AC resistance ($R_{ac}$)

Where $Q=X_L/R_{ac}$

The inductive reactance is fairly well estimated at 6409 ohms, but the value of $R_{ac}$ is still uncertain. Based on the Dartmouth Litzwire formulas, it is essentially the same as $R_{dc}$=2.4 ohms. Solatron instrument measurements taken at the University of Wisconsin-Milwaukee, however, indicate an increase in AC resistance at 50 kHz to 2.90 ohms and at 100 kHz to 3.77 ohms. Extrapolating this trend to 400 kHz results in an $R_{ac}$ estimate of 6.37 ohms. Allowing for additional nonlinear effects, a maximum $R_{ac}$ value of 10.00 ohms will be used. Depending on the actual value of $R_{ac}$, the following secondary/primary transformer turns ratios are indicated:

For $R_{ac}$=2.39 ohm, $N_s/N_p$=176:1

For $R_{ac}$=6.37 ohms, $N_s/N_p$=66:1

For $R_{ac}$=10.00 ohms, $N_s/N_p$=42:1

All of the above estimates are based on an output impedance of 600 ohms in the power generator.

Using a minimum of 3 turns on the primary winding the following turns ratios are indicated:

For $R_{ac}$=2.39 ohms, 528:3

For $R_{ac}$=6.37 ohms, 199:3

For $R_{ac}$=10.00 ohms, 126:3

To allow for intermediate values of the parameter estimates, secondary transformer taps are recommended at:

$N_s$=528, 450, 300, 199, 126 and 100

An optimal impedance match will be indicated by the reflected power value at or near zero on the power generator. The proper tap selection should result in near zero reflected power.

The inductively-coupled electroionic processing system provides a very cost effective means of water and wastewater disinfection, which has been experimentally verified.

The inductively-coupled electroionic processing system solves the electrode contamination problem of the prior art, and potentially solves the scale-up problem based on the inductive electric field formula.

$E=\pi fBR \cos 2\pi ft$

With increasing coil radius, the electric field strength also increases, so that scale-up will enhance power efficiency.

Figure 11:
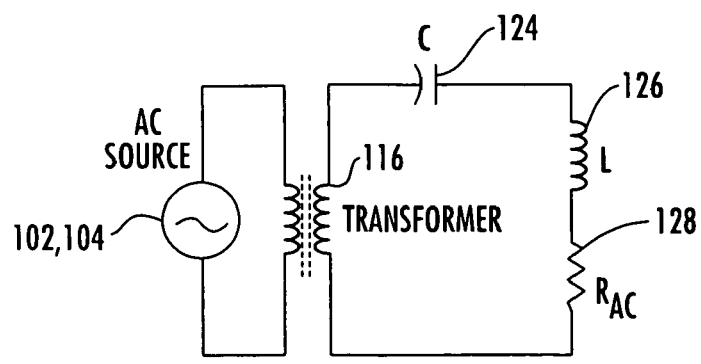
FIG. 11 is a simplified schematic circuit representation of a series resonant circuit for the inductively-coupled electroionic processing system of FIG. 6.

As mentioned above, the equivalent circuit for the inductively-coupled electroionic processing system is a series resonant LCR circuit. FIG. 11 is a simplified schematic circuit representation of a series resonant LCR circuit for the inductively-coupled electroionic processing system of FIG. 6.

The circuit includes an inductor 126 (coil), a capacitor 124, and a resistor 128 (resistance of coil) in series. By tuning the circuit to resonance, the total resistance is tuned to the resistance of the coil, which is very small. A strong field strength requires an inner core of ferromagnetic material. Circuit specifications require fabrication of the capacitor and the coil. The following are design parameters for the capacitor and coil core.

To provide sufficient energy and allow for high voltage charging a fairly large capacitor is required—on the order of 10 microfarads. Maintaining resonance at 400 kHz will then imply a much smaller coil in the range of 158 microhenries instead of the 2.55 millihenries measured above. Such a large reduction in inductance is best accomplished by reducing the number of turns for 300 to 25 or less. Reducing the cross sectional area also reduces the inductance, but such reduction likewise decreases field strength, so that turns reduction is the parameter of interest. The coil must also have a very low resistance to generate sufficient current to induce the required electric field. A set of sample design parameters includes:

C=10 microfarads for 3 kV capacity

L=158.3 microhenries, based on N=2 f=400 kHz

R=6.5 cm=2.56 inches l=4.16 meters

R=0.02 ohms

I=150 kamp

The key to this design is the capacitor. A custom fabricated capacitor needed to be designed because there is not an off-the-shelf capacitor that meets the LCR specifications for parameter range and stability.

Capacitance is defined as: $C=\in A/l$, where C=capacitance (farads), $\in$=permittivity of medium between plates (farads/meter), A=plate area (meter$^2$), and l=distance between plates (meters).

A series of capacitance measurements were carried out using the HP4276 Vector Impedance Meter and various dielectric materials in conjunction with 4×4 inch copper plates.

The formula is sometimes restated as: $C=\in_o\in_r A/l$, where $\in_o$=permittivity of air, 8.854×10$^{-12}$ F/m, and $\in_r$ is the relative permittivity of the dielectric. The desired capacitance is between 13 and 15 nF. The precise specifications are determined by experiment.

Figure 7:
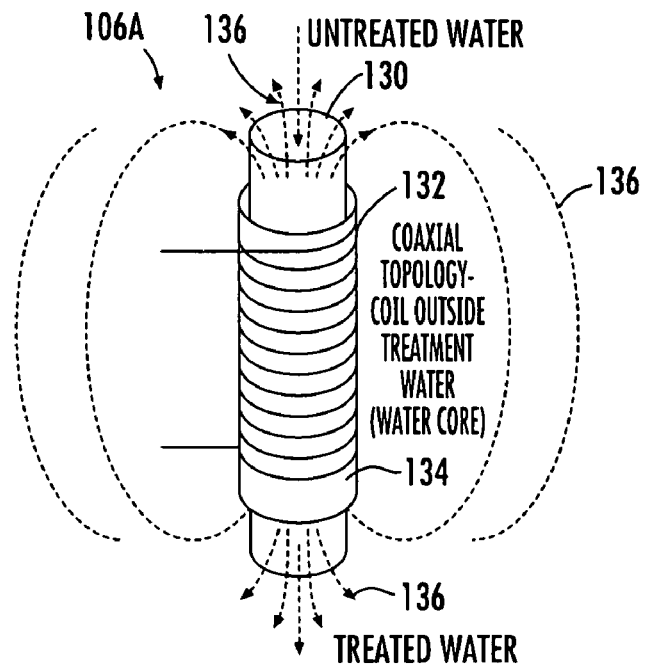
FIG. 7 is a diagram of a first coaxial topology flow cell assembly for use with the inductively-coupled electroionic processing system embodiment of the present invention.

FIG. 7 is a diagram of a first coaxial topology inductive treatment apparatus for use with the inductively-coupled electroionic processing system embodiment of the present invention. The treatment apparatus 106A includes water 130 flowing through an inductive coil 132 (water core) wound around a pipe 134 that encircles the treatment water 130. Electric field lines 136 are shown emanating from the ends of the core 130 and encircling the coil 132.

Figure 8:
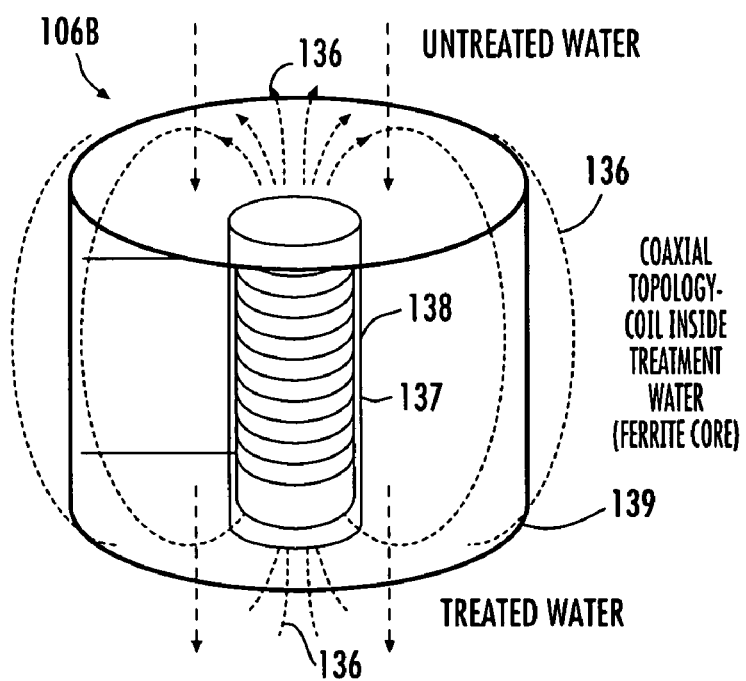
FIG. 8 is a diagram of a second coaxial topology flow cell assembly for use with the inductively-coupled electroionic processing system embodiment of the present invention.

FIG. 8 is a diagram of a second coaxial topology inductive treatment apparatus for use with the inductively-coupled electroionic processing system embodiment of the present invention. The treatment apparatus 106B includes a first pipe 137 with an inductive coil 138 with a ferrite core inserted within the first pipe 137 and a second pipe 139 formed around the first pipe 137 with water flowing around the first pipe 137 and within the second pipe 139. Electric field lines 136 are shown emanating from the ends of the core and encircling the coil.

Figure 9:
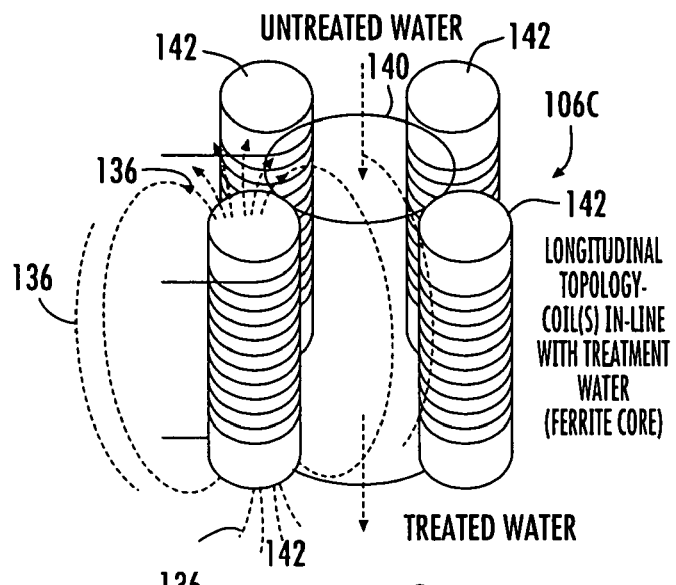
FIG. 9 is a diagram of a longitudinal topology flow cell assembly for use with the inductively-coupled electroionic processing system embodiment of the present invention.

FIG. 9 is a diagram of a longitudinal topology inductive treatment apparatus for use with the inductively-coupled electroionic processing system embodiment of the present invention. The treatment apparatus 106C includes a treatment pipe 140 with water flowing through the pipe and a plurality of inductive coils 142 longitudinally encircling the pipe. Electric field lines 136 are shown emanating from the ends of the cores and encircling the coils. The coils must be in phase so they don't cancel each other out.

Figure 10:
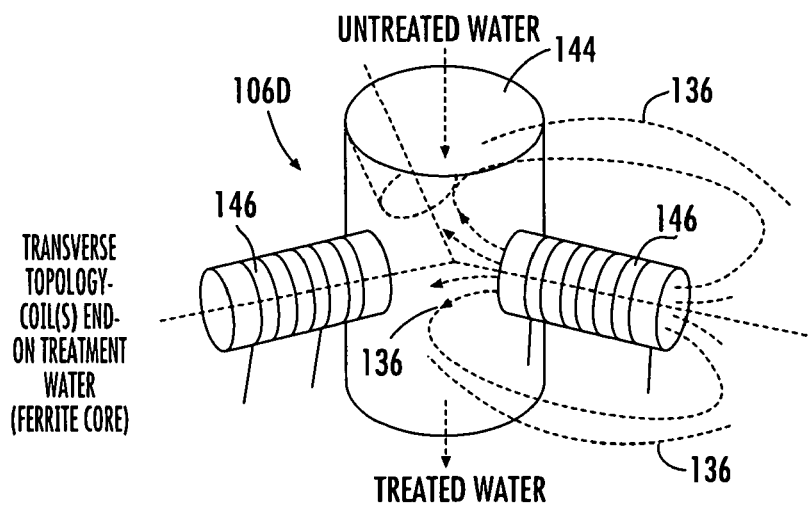
FIG. 10 is a diagram of a transverse topology flow cell assembly for use with the inductively-coupled electroionic processing system embodiment of the present invention.

FIG. 10 is a diagram of a transverse topology inductive treatment apparatus for use with the inductively-coupled electroionic processing system embodiment of the present invention. The treatment apparatus 106D includes a treatment pipe 144 with water flowing through the pipe and a plurality of inductive coils 146 transversly encircling the pipe. Electric field lines 136 are shown emanating from the ends of the cores and encircling the coils.

FIG. 12 illustrates a block diagram of an embodiment of an on-line microbial analyzer 150 to measure the microbial content of the aqueous solution being treated. The analyzer 150 preferably includes a broadband light source 152 such as a low pressure mercury lamp or ultraviolet lamp that transmits through an excitation filter 154. The light travels to the target 156 through a coaxial fiber optic bundle 158, having an outer bundle of transmitted light and an inner bundle of back scattered light from the target 156. The bundle 158 is interfaced to a pipe 159 using a special coupling fixture which allows the bundle to have a water tight seal on the inner surface of the pipe. The analyzer 150 operates by projecting transmitted light into the water target 156. Fluorescent light is back scattered into a receiving inner core of the bundle 158. This light is then transmitted back through the inner core of the bundle to an emissions filter 160 and a photomultiplier tube detector 162. A photomultiplier tube (PMT) detector is used rather than a photodiode detector because the photomultiplier tube detector has a much higher light sensitivity than a photodiode detector. The PMT signal travels through a preamplifier 164 and an A/D converter 166 for display on a display device 167 or to a computer (not shown) for further processing or data logging. A power supply 168 is included to supply a bias voltage to the PMT.

FIG. 13 illustrates a block diagram of another embodiment of an on-line microbial analyzer 170 to measure the microbial content of the aqueous solution being treated. The microbial analyzer shown in FIG. 13 includes a sensor array for measuring a specific microbe, such as *E. coli* or a class of bacteria such as coliforms, etc. In this embodiment, the emission filter 160 and PMT 162 shown in FIG. 12 is replaced by individual avalanche photo diode (APD) bandpass filters 182 and a large area avalanche photo diode (LAAPD) detector array 184. The analyzer 170 preferably includes a broadband light source 172 such as a low pressure mercury lamp or ultraviolet lamp that transmits through an excitation filter 174. The light travels to a water target 176 through a coaxial fiber optic bundle 178, having an outer bundle of transmitted light and an inner bundle of back scattered light from the target 176. The bundle 178 is interfaced to a pipe 179 using a special coupling fixture which allows the bundle to have a water tight seal on the inner surface of the pipe. The analyzer 170 operates by projecting transmitted light into the water target 176. Fluorescent light is back scattered into a receiving inner core of the bundle 178. This light is then transmitted back through the inner core of the bundle to the APD 182 and LAAPD 184. The ADP/LAAPD signal travels through a preamplifier 186 and an A/D converter 188 for display on a display device 190 or to a computer (not shown) for further processing or data logging. A power supply 190 is included to supply a bias voltage to the ADP/LAAPD. The spectrum produced by the sensor array allows for the determination of specific bacterial species population densities using mathematical/statistical algorithms implemented by software in a computer.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

The invention claimed is:

1. An electroionic apparatus for disinfection and oxidation of an aqueous solution comprising:
   a high frequency AC power source coupled to a flow cell, said power source including a signal generator supplying a high frequency AC signal to a power amplifier for amplifying the signal and an impedance matching transformer coupled to said power amplifier for connecting said signal to said flow cell, said power source creating an electromagnetic field within said flow cell and creating an ionic current flow in said flow cell.

2. The electroionic apparatus of claim 1 wherein said flow cell is inductively-coupled to said aqueous solution.

3. The electroionic apparatus of claim 1 wherein said flow cell is capacitively-coupled to said aqueous solution.

4. The electroionic apparatus of claim 1 wherein said flow cell is directly-coupled to said aqueous solution.

5. The electroionic apparatus of claim 1 wherein said flow cell includes a pair of spaced-apart electrodes mounted in aligned spaced relation to define walls of a pipe or an open channel in said aqueous solution.

6. The electroionic apparatus of claim 1 further comprising monitoring means coupled to said flow cell for monitoring a plurality of parameters in said aqueous solution.

7. The electroionic apparatus of claim 6 wherein said monitoring means includes a hydrogen peroxide analyzer for monitoring the amount of hydrogen peroxide in said aqueous solution.

8. The electroionic apparatus of claim 6 wherein said monitoring means includes a conductivity analyzer for monitoring the conductivity of said aqueous solution.

9. The electroionic apparatus of claim 6 wherein said monitoring means includes a an on-line microbial analyzer to detect and quantify the microbial population density of said aqueous solution.

10. The electroionic apparatus of claim 6 further comprising a process controller coupled to and receiving inputs from said monitoring means and coupled to and generating an output to said signal generator for controlling operation of said AC power source.

11. The electroionic apparatus of claim 10 further comprising a current sense coil and a current feedback loop coupled between said impedance matching transformer and said process controller for sensing current from said impedance matching transformer and adjusting the power output of said AC power source.

12. The electroionic apparatus of claim 1 wherein said power source has an input control to adjust the power output level and minimize electric power consumption.

13. An electroionic apparatus for disinfection and oxidation of an aqueous solution comprising:
a high frequency AC power source coupled to a flow cell, said power source including a signal generator supplying a high frequency AC signal to a power amplifier for amplifying the signal and an impedance matching transformer coupled to said power amplifier for connecting said signal to said flow cell, said power source creating an electromagnetic field within said flow cell and creating an ionic current flow in said flow cell;
wherein said ionic current flow generates hydrogen peroxide in said aqueous solution.

14. An electroionic apparatus for disinfection and oxidation of an aqueous solution comprising:
a high frequency AC power source coupled to a flow cell, said power source including a signal generator supplying a high frequency AC signal to a power amplifier for amplifying the signal and an impedance matching transformer coupled to said power amplifier for connecting said signal to said flow cell, said power source creating an electromagnetic field within said flow cell and creating an ionic current flow in said flow cell;
wherein said ionic current flow generates hydroxyl radicals in said aqueous solution.

15. A method for electroionic disinfection and oxidation of an aqueous solution, the method comprising the steps of:
passing said aqueous solution through a flow cell; and
supplying a high frequency AC power source to said flow cell, said power source including a signal generator supplying a high frequency AC signal to a power amplifier for amplifying the signal and an impedance matching transformer coupled to said power amplifier for connecting said signal to said flow cell, said power source creating an electromagnetic field within said flow cell and creating an ionic current flow in said electrodes flow cell.

16. The method of claim 15 further comprising the step of generating hydrogen peroxide in said aqueous solution.

17. The method of claim 15 further comprising the step of generating hydroxyl radicals in said aqueous solution.

18. The method of claim 15 further comprising the step of coupling a plurality of analyzers to said flow cell for monitoring a plurality of parameters in said aqueous solution.

19. The method of claim 18 further comprising the step of coupling a process controller between said plurality of analyzers and said signal generator for controlling operation of said AC power source.

20. The method of claim 19 further comprising the step of coupling a current sense coil and a current feedback loop between said impedance matching transformer and said process controller for sensing current from said impedance matching transformer and adjusting the power output of said AC power source.

21. The method of claim 15 further comprising the step of coupling a hydrogen peroxide analyzer to said flow cell for monitoring the amount of hydrogen peroxide in said aqueous solution.

22. The method of claim 15 further comprising the step of coupling an on-line microbial analyzer to said flow cell to detect and quantify the microbial population density of said aqueous solution.

23. The method of claim 15 further comprising the step of coupling a conductivity analyzer to said flow cell for monitoring the conductivity of said aqueous solution.

24. An electroionic apparatus for disinfection and/or oxidation of an aqueous solution comprising:
a flow cell through which said aqueous solution flows therethrough; and
a high frequency AC power source coupled to said flow cell, said power source including a signal generator supplying a high frequency AC signal to a power amplifier for amplifying the signal and an impedance matching transformer coupled to said power amplifier for connecting said signal to said flow cell, said power source creating an electromagnetic field within said flow cell and creating an ionic current flow in said flow cell.

25. The electroionic apparatus of claim 24 wherein said flow cell is an inductive treatment cell including at least one coil wrapped around at least one core.

26. The electroionic apparatus of claim 25 further comprising a capacitor coupled to said at least one coil of said inductive treatment cell.

27. The electroionic apparatus of claim 24 wherein said flow cell includes at least two spaced-apart electrodes.

28. The electroionic apparatus of claim 27 wherein each of said electrodes includes a first surface and a second surface, wherein said first surface of each electrode is coated with a dielectric material having a low coefficient of friction, and wherein said dielectric material is in contact with said aqueous solution forming capacitively-coupled electrodes for capacitively-coupling said flow cell to said aqueous solution.

29. The electroionic apparatus of claim 24 further comprising monitoring means coupled to said flow cell for monitoring a plurality of parameters in said aqueous solution.

30. The electroionic apparatus of claim 29 wherein said monitoring means includes a conductivity analyzer for monitoring the conductivity of said aqueous solution.

31. The electroionic apparatus of claim 29 wherein said monitoring means includes a hydrogen peroxide analyzer for monitoring the amount of hydrogen peroxide in said aqueous solution.

32. The electroionic apparatus of claim 29 wherein said monitoring means includes an on-line microbial analyzer to detect and quantify the microbial population density of said aqueous solution.

33. The electroionic apparatus of claim 24 wherein said power source includes an input control to adjust the power output level and minimize power consumption.

34. An electroionic apparatus for disinfection and/or oxidation of an aqueous solution comprising:
a flow cell through which said aqueous solution flows therethrough; and
a high frequency AC power source coupled to said flow cell, said power source including a signal generator supplying a high frequency AC signal to a power amplifier for amplifying the signal and an impedance matching transformer coupled to said power amplifier for connecting said signal to said flow cell, said power source creating an electromagnetic field within said flow cell and creating an ionic current flow in said flow cell;

wherein hydrogen peroxide is produced in said aqueous solution.

35. An electroionic apparatus for disinfection and/or oxidation of an aqueous solution comprising:
a flow cell through which said aqueous solution flows therethrough; and
a high frequency AC power source coupled to said flow cell, said power source including a signal generator supplying a high frequency AC signal to a power amplifier for amplifying the signal and an impedance matching transformer coupled to said power amplifier for connecting said signal to said flow cell, said power source creating an electromagnetic field within said flow cell and creating an ionic current flow in said flow cell;
wherein hydroxyl radicals are produced in said aqueous solution.

36. An electroionic apparatus for lowering organic compound concentrations in an aqueous solution comprising:
an inductive treatment cell including at least one coil wrapped around at least one core, said inductive treatment cell positioned in a flow system through which said aqueous solution passes therethrough;
a capacitor coupled to said at least one coil of said inductive treatment cell; and
a high frequency AC power source coupled to said capacitor and said inductive treatment cell, said power source including a signal generator supplying a high frequency AC signal to a power amplifier for amplifying the signal and an impedance matching transformer coupled to said power amplifier for connecting said signal to said capacitor and said inductive treatment cell, said power source creating an electromagnetic field within said inductive treatment cell and creating an ionic current flow in said inductive treatment cell.

37. The electroionic apparatus of claim 36 wherein said inductive treatment cell is a high Q resonant LCR circuit.

38. An electroionic apparatus for lowering organics in a aqueous solution comprising:
a treatment cell including at least two spaced-apart electrodes positioned in a flow system through which said aqueous solution flows; and
a high frequency AC power source coupled to said electrodes in said treatment cell, said power source including a signal generator supplying a high frequency AC signal to a power amplifier for amplifying the signal and an impedance matching transformer coupled to said power amplifier for connecting said signal to said treatment cell, said power source creating an electromagnetic field within said treatment cell and creating an ionic current flow between said electrodes;
wherein each of said electrodes includes a first surface and a second surface, wherein said first surface of each electrode is coated with a dielectric material having a low coefficient of friction, and wherein said dielectric material is in contact with said aqueous solution forming capacitively-coupled electrodes for capacitively-coupling said treatment cell to said aqueous solution.

39. An electroionic apparatus for lowering organics in an aqueous solution comprising:
a treatment cell including at least two spaced-apart electrodes positioned in a flow system through which said aqueous solution passes therethrough; and
a high frequency AC power source coupled to said electrodes in said treatment cell, said power source including a signal generator supplying a high frequency AC signal to a power amplifier for amplifying the signal and an impedance matching transformer coupled to said power amplifier for connecting said signal to said treatment cell, said power source creating an electromagnetic field within said treatment cell and creating an ionic current flow between said electrodes.

40. An electroionic apparatus for treating wastewater and/or potable water comprising:
a flow cell; and
a high frequency AC power source coupled to said flow cell, said power source including a signal generator supplying a high frequency AC signal to a power amplifier for amplifying the signal and an impedance matching transformer coupled to said power amplifier for connecting said signal to said flow cell, said power source creating an electromagnetic field within said flow cell and creating an ionic current flow in said flow cell;
wherein said wastewater and/or potable water flows through said flow cell for disinfecting and oxidizing said wastewater and/or potable water.

41. A flow cell assembly for disinfection of wastewater and/or potable water wherein said wastewater and/or potable water flows through a flow cell, said flow cell assembly comprising:
a high frequency AC power supply coupled to an electronic circuit which is coupled to said flow cell, said power supply including a signal generator supplying a high frequency AC signal to a power amplifier for amplifying the signal and an impedance matching transformer coupled to said power amplifier for connecting said signal to said flow cell, said power supply creating an electromagnetic field within said flow cell and creating an ionic current flow in said flow cell.

42. A method for electroionically processing aqueous solutions, said method comprising the steps of:
passing said aqueous solutions through a flow cell; and
applying a high frequency AC power source to said flow cell, said power source including a signal generator supplying a high frequency AC signal to a power amplifier for amplifying the signal and an impedance matching transformer coupled to said power amplifier for connecting said signal to said flow cell, said power source creating an electromagnetic field within said flow cell and creating an ionic current flow in said flow cell.

43. A method for disinfecting and/or oxidizing aqueous solutions, the method comprising the steps of:
providing a flow cell for aqueous solutions to flow through said flow cell; and
applying a high frequency AC power source to said flow cell, said power source including a signal generator supplying a high frequency AC signal to a power amplifier for amplifying the signal and an impedance matching transformer coupled to said power amplifier for connecting said signal to said flow cell, said power source creating an electromagnetic field within said flow cell and creating an ionic current flow in said flow cell.

44. A method of generating hydrogen peroxide, said method comprising the steps of:
applying a high frequency AC power source to a flow cell with an aqueous solution flowing therethrough, said power source including a signal generator supplying a high frequency AC signal to a power amplifier for amplifying the signal and an impedance matching transformer coupled to said power amplifier for con necting said signal to said flow cell, said power source creating an electromagnetic field within said flow cell and creating an ionic current flow in said flow cell for generating hydrogen peroxide.

45. An electroionic apparatus for disinfection and oxidation of an aqueous solution comprising:

a high frequency AC power source coupled to a flow cell, said power source including a signal generator supplying a high frequency AC signal to a power amplifier for amplifying the signal and an impedance matching means for matching the impedance of said power source to said flow cell, said power source creating an electromagnetic field within said flow cell and creating an ionic current flow in said flow cell.

* * * * *